(12) United States Patent
Kleinguetl et al.

(10) Patent No.: US 11,459,245 B2
(45) Date of Patent: Oct. 4, 2022

(54) WASTEWATER AND EFFLUENT SEPARATION AND TREATMENT SYSTEMS

(71) Applicant: Halliburton Energy Services, Inc., Houston, TX (US)

(72) Inventors: Kevin G. Kleinguetl, Kingwood, TX (US); Brice Aaron Jackson, Houston, TX (US); Lawrence Joseph Herskowitz, Pearland, TX (US); Adam Dotson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 442 days.

(21) Appl. No.: 16/331,045

(22) PCT Filed: Dec. 20, 2017

(86) PCT No.: PCT/US2017/067666
§ 371 (c)(1),
(2) Date: Mar. 6, 2019

(87) PCT Pub. No.: WO2019/125440
PCT Pub. Date: Jun. 27, 2019

(65) Prior Publication Data
US 2020/0308021 A1     Oct. 1, 2020

(51) Int. Cl.
*C02F 1/00*     (2006.01)
*C02F 1/24*     (2006.01)
(Continued)

(52) U.S. Cl.
CPC ............... *C02F 1/008* (2013.01); *C02F 1/24* (2013.01); *C02F 1/38* (2013.01); *C02F 1/40* (2013.01);
(Continued)

(58) Field of Classification Search
CPC .... C02F 1/008; C02F 1/24; C02F 1/38; C02F 1/40; C02F 1/66; C02F 1/00; C02F 1/52;
(Continued)

(56) References Cited

U.S. PATENT DOCUMENTS 6,979,398 B2   12/2005   Veilleux et al.
8,293,097 B2   10/2012   Bowers, Jr.
(Continued)

FOREIGN PATENT DOCUMENTS

CN          202430073 U       9/2012

OTHER PUBLICATIONS

International Search Report and Written Opinion issued in related PCT Application No. PCT/US2017/067666 dated Sep. 14, 2018, 17 pages.

*Primary Examiner* — Akash K Varma
(74) *Attorney, Agent, or Firm* — Kilpatrick Townsend & Stockton LLP (57) ABSTRACT

Automated systems and methods for treating wastewater or effluent are provided. In some embodiments, the methods include: using a set of sensors to measure one or more properties of untreated wastewater or effluent; performing at least one potential chemical treatment and at least one potential mechanical treatment on a sample of the untreated wastewater or effluent, wherein the potential chemical and mechanical treatments are selected based on the properties of the untreated wastewater or effluent; using a set of sensors to measure one or more properties of the treated sample; based at least in part on the data regarding the properties of the treated sample, using an information handling system to select at least one chemical treatment and at least one mechanical treatment; and using the information handling system to control one or more components of a chemical treatment subsystem and a mechanical treatment subsystem (Continued)

to perform the selected chemical and mechanical treatments on the untreated wastewater or effluent to produce treated water.

20 Claims, 4 Drawing Sheets

(51) Int. Cl.
| | | |
|---|---|---|
| *C02F 1/40* | (2006.01) | |
| *C02F 1/38* | (2006.01) | |
| *C02F 1/66* | (2006.01) | |
| *C02F 103/00* | (2006.01) | |
| *C02F 103/10* | (2006.01) | |

(52) U.S. Cl.
CPC .......... *C02F 1/66* (2013.01); *C02F 2103/008* (2013.01); *C02F 2103/10* (2013.01); *C02F 2201/001* (2013.01); *C02F 2209/001* (2013.01); *C02F 2209/003* (2013.01); *C02F 2209/006* (2013.01); *C02F 2209/008* (2013.01); *C02F 2209/05* (2013.01); *C02F 2209/06* (2013.01); *C02F 2209/10* (2013.01); *C02F 2209/11* (2013.01); *C02F 2301/08* (2013.01)

(58) Field of Classification Search
CPC ...... C02F 1/56; C02F 9/04; C02F 9/00; C02F 11/00; C02F 2103/008; C02F 2103/10; C02F 2201/001; C02F 2209/001; C02F 2209/003; C02F 2209/006; C02F 2209/008; C02F 2209/05; C02F 2209/06; C02F 2209/10; C02F 2209/11; C02F 2209/005; C02F 2301/08; B01D 21/30; B01D 21/34; G06N 7/00; G01F 1/00
USPC ........................................................ 210/743
See application file for complete search history.

(56) References Cited

U.S. PATENT DOCUMENTS

| | | | |
|---|---|---|---|
| 8,983,667 | B2 | 3/2015 | Smaidris |
| 9,120,038 | B2 | 9/2015 | Reilly et al. |
| 2004/0124138 | A1* | 7/2004 | Veilleux .................. C02F 3/006 210/614 |
| 2009/0230033 | A1* | 9/2009 | Bowers, Jr. ........... C02F 1/5209 210/85 |
| 2012/0055859 | A1* | 3/2012 | Reilly ..................... C02F 3/121 210/141 |
| 2015/0001161 | A1 | 1/2015 | Wiemers et al. |
| 2017/0061309 | A1 | 3/2017 | Wasserkrug et al. |
| 2017/0297929 | A1* | 10/2017 | Whitaker ............... C02F 1/5209 |

\* cited by examiner

WASTEWATER AND EFFLUENT SEPARATION AND TREATMENT SYSTEMS

CROSS-REFERENCE TO RELATED APPLICATION

The present application is a U.S. National Stage Application of International Application No. PCT/US2017/067666 filed Dec. 20, 2017, which is incorporated herein by reference in its entirety for all purposes.

BACKGROUND

The present disclosure relates to systems and methods for treating wastewater or effluent such as water that has been used in conjunction with subterranean operations.

Various types of subterranean well bore operations (e.g., fracturing, drilling, etc.) sometimes generate large volumes of wastewater or effluent, such as produced water, surface water, flowback water, and the like. Typically, this wastewater or effluent is collected into various ponds, sumps, pits, or tanks at a job site and eventually transferred to a main holding area or sump. From here, the water may be transferred to a water treatment plant for processing before discharge to the environment. Wastewater and effluent may contain a variety of components, including but not limited to a dilute slurry of finely dispersed particulates or other undissolved solids, either indigenous to the subterranean formation or mine site or a by-product of a mining or well treatment operation. Wastewater or effluent also may be produced by other processes and/or equipment at a job site, including but not limited to rainwater and deck drainage, as well as water used as a coolant, washdown or cleaning fluid, storm water, and/or other surface operations.

Moreover, certain drilling fluids may include invert emulsion fluids, i.e., emulsions in which the non-oleaginous fluid is the discontinuous phase and the oleaginous fluid is the continuous phase. During the drilling process, it is not uncommon for such invert emulsion drilling fluids to encounter a water bearing formation, which may alter the ratio of oleaginous fluid to non-oleaginous fluid. In some cases, emulsions that are difficult to break may form in the fluid. The recovered drilling fluid also may include other waste materials such as oils and/or particulate materials suspended therein. Many offshore rigs drilling with oil-based drilling fluids may produce significant amounts of wastewater or effluent that includes oil, dissolved and undissolved salts, coarse and fine undissolved solids in this way. Conventional emulsion breaker additives sometimes may be used to treat such fluids and restore the desired ratios. The wastewater or effluent usually may not be directly discharged into the sea because of its hydrocarbon content, which is usually higher than regulatory limits. Therefore, wastewater or effluent produced at offshore rigs is often transported in containers to shore for disposal according to the local regulations, or treated to remove waste materials before the remaining clean water can be either discharged or reused. The transportation of waste materials and/or untreated wastewater or effluent can be costly and/or increase the operational complexity of offshore drilling operations.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure relates to systems and methods for treating wastewater or effluent such as water that has been used in conjunction with subterranean operations. More particularly, the present disclosure relates to automated systems and methods for treating wastewater or effluent.

The wastewater or effluent treated using the methods and/or systems of the present disclosure may include any aqueous fluid from any source, including but not limited to water or another aqueous fluid recovered from a subterranean formation at a job site. That wastewater or effluent may include water or other aqueous fluids that had been used as treatment fluids in the formation, naturally occurring water or other aqueous fluids residing in the formation, or a combination thereof. In those embodiments, the wastewater or effluent may be recovered from the subterranean formation in conjunction with any type of subterranean operation or treatment, including but not limited to hydraulic fracturing treatments, acidizing treatments, and drilling operations. In certain embodiments, a drilling fluid may be introduced into a subterranean formation while drilling at least a portion of a well bore that penetrates a subterranean formation, and the drilling fluid may serve a number of purposes, including but not limited to suspending and circulating drill cuttings out of the well bore, cooling and/or lubricating a drill bit, and the like. Wastewater and effluent also may be produced by other processes and/or equipment at a job site, including but not limited to rainwater and deck drainage, as well as water used as a coolant, cleaning fluid, and/or other surface operations. Once the wastewater or effluent is treated, the treated water may be discharged or re-used in one or more of the operations listed above. For example, in some embodiments, the treated water may be pumped into a mud pit where drilling fluids are prepared and/or held prior to use. The treated water may be mixed with one or more additional components in the mud pit and then pumped out into a drillstring or coiled tubing that is used to drill at least a portion of a well bore penetrating a subterranean formation (e.g., the same subterranean formation from which the wastewater was recovered).

In the methods of the present disclosure, wastewater or effluent from a job site that contains some amount of waste materials such as oils, emulsions, and/or particulate material is collected. A set of sensors are used to measure one or more initial properties of the untreated wastewater or effluent, including but not limited to pH, turbidity, emulsion strength, capacitance, dielectric constant, impedance, loss tangent, reactance phase angle, acoustic attenuation, acoustic relaxation, thermal conductivity, electrical conductivity, salinity, oil content, solids content, water content, and the like. In some embodiments, the initial properties of the untreated wastewater or effluent may be determined using a sample, or may be measured in the bulk volume (e.g., holding tank, conduit, etc.) of the untreated wastewater or effluent. In either case, a sample of the wastewater or effluent is taken, and one or more chemical treatments and/or one or more mechanical treatments may be performed on the sample. In some embodiments, the chemical treatments and/or mechanical treatments performed on the wastewater or effluent sample may be selected, at least in part, based on the initial properties of the untreated wastewater or effluent in combination with data obtained from literature sources and/or past treatments performed by the system. A set of sensors is then used to obtain data regarding one or more properties of the treated sample. The sampling and treatment of wastewater or effluent samples may be repeated for any suitable number of different chemical and mechanical treatments, including different variations (e.g., varied conditions/parameters of a treatment), combinations and permutations thereof, and data regarding the properties of each sample treated may be collected. Such treatments of multiple samples of untreated wastewater or effluent may be performed sequentially or may be performed substantially simultaneously (e.g., in parallel) with one another, among other reasons, to increase the speed or efficiency of the process. Based at least in part on the data regarding the properties of the treated sample(s), an information handling system such as a computer may select at least one chemical treatment and at least one mechanical treatment to reduce the amount of one or more waste materials in the untreated wastewater or effluent, and control one or more components of at least one chemical treatment subsystem and at least one mechanical treatment subsystem to perform the selected chemical and mechanical treatment on the untreated wastewater or effluent.

As a person of ordinary skill in the art will recognize, with the benefit of this disclosure, "untreated wastewater or effluent" as referenced herein refers to wastewater or effluent that has not yet been treated using a method or system of the present disclosure. However, such "untreated wastewater or effluent" may have been subjected to one or more other pre-treatments, which may include any chemical or mechanical pre-treatments known in the art.

In some embodiments, once the waste materials are separated from the wastewater or effluent using the chemical and mechanical treatments, those waste materials optionally may be placed in a disposal container for disposal or transport while the remaining treated water may be discharged and/or reused in subsequent operations (e.g., further subterranean operations at the same job site from which the wastewater was recovered). For example, in some embodiments, the treated water may be pumped into a mud pit where drilling fluids are prepared and/or held prior to use. The treated water may be mixed with one or more additional components in the mud pit and then pumped out into a drillstring or coiled tubing that is used to drill at least a portion of a well bore penetrating a subterranean formation (e.g., the same subterranean formation from which the wastewater was recovered). In some embodiments, the methods and systems of the present disclosure optionally may use the information handling system to automatically clean any filters or other equipment in the chemical or mechanical treatment subsystems such as skimmers, beaches, screens, and the like.

The systems of the present disclosure generally include: a test treatment subsystem configured to (a) obtain a first set of data regarding one or more initial properties of untreated wastewater or effluent using one or more sensors, (b) perform one or more chemical treatments and one or more mechanical treatments on a sample of the untreated wastewater or effluent, and (c) obtain a second set of data regarding one or more properties of the treated sample using one or more sensors; one or more chemical treatment subsystems in which one or more chemical additives may react with one or more waste materials in the untreated wastewater or effluent, e.g., to remove, neutralize, or otherwise alter the form of the waste materials in the wastewater or effluent; one or more mechanical treatment subsystems in which the waste materials in the wastewater or effluent can be physically separated from the water; at least one information handling subsystem communicatively coupled to the test treatment subsystem, the chemical treatment subsystems, and the mechanical treatment subsystems, the information handling subsystem being configured to: receive the first and second sets of data from the sensors, use the first and second sets of data to select at least one chemical treatment and at least one mechanical treatment to reduce the amount of one or more waste materials in the untreated wastewater or effluent, control one or more components of at least one chemical treatment subsystem to perform the selected chemical treatment on the untreated wastewater or effluent, and control one or more components of at least one mechanical treatment subsystem to perform the selected mechanical treatment on the wastewater or effluent. In some embodiments, the treatment systems optionally may include multiple chemical or mechanical treatment systems, as well as additional tanks, vessels, conduits, or other devices for removing, storing, and or disposing of waste materials from water.

For the purposes of this disclosure, the term "communicatively coupled" as used herein is intended to mean coupling of components or subsystems (e.g., an information handling subsystem, treatment subsystem, or a component such as an interface or controller thereof) in a way to permit communication of information therebetween. Two components or subsystems may be communicatively coupled through a wired or wireless communication network, including but not limited to Ethernet, LAN, fiber optics, radio, microwaves, satellite, and the like. Operation and use of such communication networks is well known to those of ordinary skill in the art and will, therefore, not be discussed in detail herein.

Among the many potential advantages to the methods and compositions of the present disclosure, only some of which are alluded to herein, the methods, compositions, and systems of the present disclosure may increase the efficiency and/or effectiveness of wastewater or effluent treatment in subterranean operations and at other job sites. For example, the methods and systems may rely less on human intervention and treatment selection than conventional methods, and may more effectively leverage historical data regarding wastewater or effluent treatment to more quickly and/or accurately select an effective treatment. In some embodiments, this more effective and/or efficient wastewater or effluent treatment may reduce the cost associated with waste disposal and water recycling in subterranean operations and at other job sites. In some embodiments, the methods and systems may reduce the amounts and/or concentrations of contaminants in wastewater or effluent sufficiently to re-use that treated wastewater in subsequent operations (e.g., as a fracturing fluid, completion brine, etc.) at the same well site or job site where it was recovered. This may, among other benefits, reduce or eliminate the cost associated with transporting fresh water to the well site or job site for such operations.

In some embodiments, the treatment systems of the present disclosure may be located, and the treatment methods may performed, on an offshore rig or ship that is engaged in offshore subterranean operations, such as a drilling rig or drill ship. In other embodiments, the treatment systems may be located, and the treatment methods may be performed, at a land-based job site. The various components of the treatment systems discussed herein, as well as any other components of those systems, may be housed together in a single unit, or may be provided as one or more separate modules or tanks that may be connected and/or otherwise used together to perform different portions of the treatment process.

Any known and measurable properties of the wastewater or effluent may be used in the methods and systems of the present disclosure, including but not limited to pH, turbidity, emulsion strength, capacitance, impedance, thermal conductivity, electrical conductivity, salinity, oil content, solids content, water content, and any combinations thereof. The sensors used to measure these properties also may include any known sensing or measurement equipment, including but not limited to thermistors, transducers, cameras, flow sensors, optical sensors, pH sensors, retort devices, and any combinations thereof. In some embodiments, a guided wave radar system or other level sensor device may be used to detect separated layers of oil or aqueous fluids, and properties regarding the size and/or nature of those layers may be measured.

The chemical treatments used in the methods and systems may include the use any chemical additives known in the art for treating wastewater or effluent. Examples of chemical additives that may be suitable include, but are not limited to, flocculants, surfactants (e.g., foamers, defoamers, emulsifiers, demulsifiers), pH adjusters (e.g., buffers, acids, bases), viscosifiers, biocides, coagulants, corrosion inhibitors, oxygen scavengers, sulfide scavengers, scale inhibitors, and any combinations thereof. In some embodiments, the chemical treatments may involve the addition of such additives to and/or reaction of such additives with components of the wastewater or effluent at one or more different parameters, all of which may be varied in different chemical treatments. Examples of such parameters include, but are not limited to, temperature, static pressure, pressure drop, shear rate, flow rate, additive concentration, additive dosing rate, residence time (e.g., time that the additive is allowed to react with components of the wastewater or effluent before other treatments are performed), and any combinations thereof.

The mechanical treatments used in the methods and systems may include any techniques known in the art for separating substances in a mixture such as wastewater or effluent recovered at a well site or job site. Examples of such techniques that may be suitable include, but are not limited to, dissolved air flotation, skimming, filtration, reverse osmosis, settling, centrifuging, electric field application, electrocoagulation, and any combinations thereof. In some embodiments, the mechanical treatments may involve performing certain actions with the wastewater or effluent at one or more different parameters, all of which may be varied in different mechanical treatments. Examples of such parameters include, but are not limited to, temperature, pressure, electric field strength, flow rate, centrifuge speed, residence time (e.g., time that the additive is subjected to the mechanical treatment), filter material and/or pore size, and any combinations thereof.

The chemical and mechanical treatment subsystems may include any vessels (e.g., tanks) or conduits suitable for conducting those treatments, and may be of any suitable shape and size for holding and/or treating wastewater or effluent. The vessels in these subsystems may include one or more inlets through which wastewater or effluent may flow into the vessel, and one or more outlets through which water may be released after the treatment has been conducted. Any suitable valves, nozzles, pumps, or other devices may be used, among other purposes, for controlling the flow of water through inlets and/or outlets of these vessels or conduits. In some embodiments, these vessels and/or conduits also may be equipped with arrays of sensors for detecting various types of phenomena (e.g., condition of certain equipment therein, flow of fluids, etc.) or properties of a fluid in the vessel and/or conduit. In some embodiments, the chemical and/or mechanical treatment subsystems each may include a series of two or more vessels or conduits, each of which may perform a different type of treatment on the wastewater or effluent in series or in parallel. In some embodiments, the chemical treatment subsystems may include one or more additive storage containers and/or dispensers for holding and/or dispensing chemical additives into the wastewater or effluent in the vessel or conduit of that subsystem, or other actuatable components (e.g., agitators, heaters, coolant systems, etc.). In some embodiments, the chemical additive dispensers and/or other actuatable components may be communicatively coupled to the information handling system and actuated or otherwise controlled by signals received from the information handling system without the need for human intervention or action directed to that action. In some embodiments, the mechanical treatment subsystems also may include one or more actuatable components such as pumps, agitators, skimmers, filters, centrifuges, heaters, electrical current generators, and the like. In some embodiments, these actuatable components may be communicatively coupled to the information handling system and actuated or otherwise controlled by signals received from the information handling system without the need for human intervention or action directed to that action.

The information handling systems (e.g., information handling subsystems) of the present disclosure may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory, which may reside on one or more forms of computer-readable media. For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/ or flash memory; as well as communications media such wires, optical fibers, microwaves, radio waves, and other electromagnetic and/or optical carriers; and/or any combination of the foregoing. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device, which may be capable of actuating or otherwise controlling the action of another mechanical component, e.g., without the need for human intervention or action directed to that action.

The information handling systems may be configured to select chemical and mechanical treatments for wastewater or effluent using various different techniques. For example, the information handling system may use a neural network or other model based on data from prior testing of wastewater or effluent to select chemical and mechanical treatments that are likely to reduce the amounts or concentrations of waste materials in the wastewater or effluent to or below a targeted amount or concentration. In some embodiments, those targeted amounts or concentrations may correspond to the maximum amounts or concentrations of such waste materials permitted by regulations governing the disposal/discharge of water into the environment, or the maximum amounts or concentrations of such waste materials permitted by specifications for water to be reused in various operations at a job site. In some embodiments, the information handling system may retain data obtained from the treatments of the present disclosure and/or use that data to update the neural network and/or other models used to select future treatments of wastewater or effluent.

Figure 1:
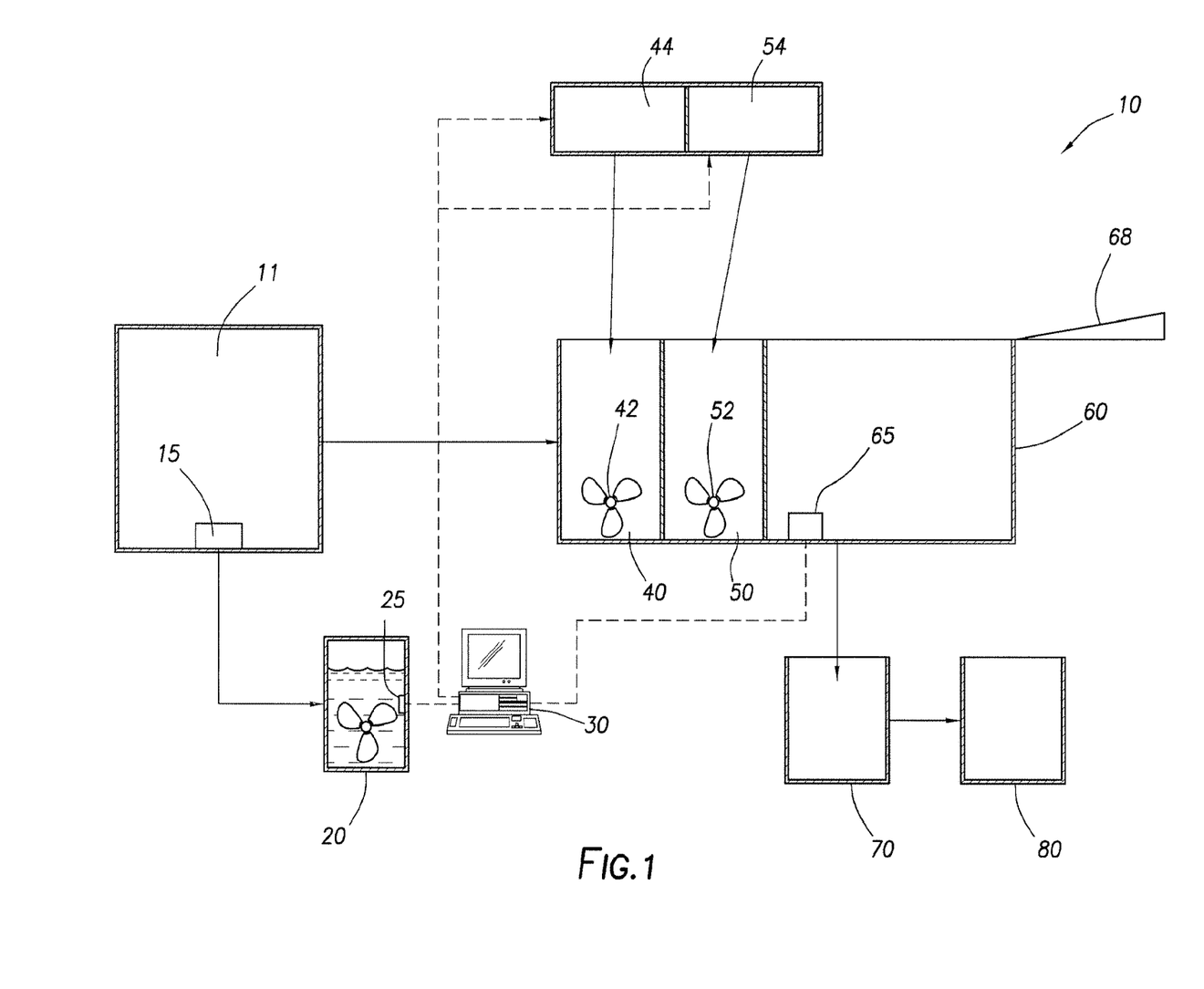
FIG. 1 is a diagram illustrating a treatment system according to certain embodiments of the present disclosure.

A portion of a treatment system 10 according to certain aspects of the present disclosure is illustrated in FIG. 1. The treatment system 10 is typically located at a well site, but alternatively may be deployed at other locations where wastewater or effluent carrying waste materials such as oils, emulsions, and/or particulate material is treated. In some embodiments, the treatment system 10 may be located on an offshore rig or ship that is engaged in offshore subterranean operations, such as a drilling rig or drill ship. In other embodiments, the treatment system 10 may be located at a land-based jobsite. The components of the treatment system of the present disclosure shown in FIG. 1, as well as any other components of that system, may be housed together in a single unit, or may be provided as one or more separate modules or tanks that may be connected and/or otherwise used together to perform different portions of the treatment process. As a person of skill in the art will recognize with the benefit of this disclosure, the chemical and/or mechanical treatment subsystems (as well as the components thereof) may be arranged in configurations other than those shown in FIG. 1.

Referring now to FIG. 1, treatment system 10 includes a holding tank 11 in which wastewater or effluent may be deposited after use in a subterranean operation such as a drilling operation. Alternatively, wastewater or effluent may enter a treatment tank of system 10 directly via a conduit (e.g., into which the wastewater or effluent flows once it is recovered from an operation) without passing through a holding tank. Holding tank 10 is equipped with an array of sensors 15 for measuring one or more initial properties of the untreated wastewater or effluent. The system 10 also includes a sample treatment subsystem that includes at least one sample treatment vessel 20 such as a small tank, test tube, sample cell, or a plurality thereof, where chemical treatments may be tested on one or more samples of the untreated wastewater or effluent. The samples of the wastewater or effluent in holding tank 10 may be transferred to the sample treatment vessel 20 using any known sampling devices, which may be automated (e.g., by an information handling system) to take samples at predetermined times (e.g., once a day, twice a day, etc.). Each sample treatment vessel 20 is also equipped with an array of sensors 25, which are used to measure one or more properties of the sample after one or more treatments are performed, and may be used to measure one or more initial properties of the untreated sample.

The sensor arrays 15 and 25 are communicatively coupled to an information handling system 30, which may be disposed at the same location as the rest of system 10 or may reside at a remote location. The information handling system 30 receives the data from the sensor arrays 15 and 25 and uses that data to select one or more chemical treatments and one or more mechanical treatments (including parameters thereof) to neutralize and/or remove waste material from the untreated wastewater or effluent in holding tank 11. Once the appropriate treatments have been selected, the wastewater or effluent in holding tank 11 may be transferred (e.g., pumped) into a chemical treatment subsystem that includes one or more chemical treatment tanks. In the embodiment shown, the chemical treatment subsystem includes a first chemical treatment tank 40 and a second chemical treatment tank 50, each of which are equipped with agitation devices 42 and 52 (e.g., rotary stirring rods, paddles, blades, air nozzles, etc.), as well as other equipment (not shown) such as heaters, coolant systems, and the like that may be used to control various conditions in the treatment tanks. The chemical treatment subsystem also includes chemical additive hoppers 44 and 54 that are configured to dispense chemical additives into each of the chemical treatment tanks 40 and 50. The additives dispensed from hoppers 44 and 54 may include the same type or different types of chemical additives. The hoppers 44 and 54 may be equipped with any suitable devices for dispensing additives into the chemical treatment tank, particularly without the need for human intervention. For example, in the embodiment shown, interfaces of hoppers 44 and 54 may be communicatively coupled to information handling system 30, which may be used to select from a plurality of different additives stored in hoppers 44 and 54 (as well as other hoppers or additive dispensing units not shown) and control the rate/amount of additives dispensed therefrom into the chemical treatment tanks 40 and 50. In some embodiments, the information handling system also may be communicatively coupled to interfaces associated with other actuatable equipment of the chemical treatment system, including but not limited to agitation devices 42 and 52 as well as heaters, coolant systems, valves, pumps, etc. (not shown), to control the operation of that equipment as the wastewater or effluent is chemically treated.

In the embodiment shown, wastewater or effluent may be treated using one or more chemical additives in chemical treatment tank 40 and, after a certain residence time therein, subsequently may be passed into chemical treatment tank 50 for treatment with one or more of the same or different chemical additives. As a person of ordinary skill in the art will recognize with the benefit of this disclosure, the chemical treatment subsystem may include any number of chemical treatment tanks (e.g., at least 3 or more tanks) arranged in series in this manner.

Once the wastewater or effluent has been chemically treated in the chemical treatment subsystem, it may be transferred (e.g., via one or more conduits, outlets, pumps, etc.) into a mechanical treatment subsystem that includes at least one mechanical treatment tank 60. As discussed above, this tank 60 may be equipped with one or more actuatable components such as pumps, agitators, skimmers, filters, centrifuges, heaters, electrical current generators, and the like that are used to perform various functions in separating waste materials from the water in the tank 60. In other embodiments, tank 60 may simply include a flotation or settling tank in which waste materials are permitted to float to the surface of the water or settle out on the bottom of the tank. In the embodiment shown, tank 60 is equipped with a beach 68 onto which waste materials such as oils, emulsions, and/or particulates at or near the surface of the tank 60 may be skimmed and/or moved for disposal. The beach 68 generally includes a top ramped surface, which may be either a planar surface or a concave curved surface. The top surface of the beach includes a base end at a lower elevation relative to the bottom surface of the tank 60 and a top end opposite the base end at a higher elevation relative to the bottom surface of the tank 60. In the embodiment shown, beach 68 is disposed adjacent to a side wall of the tank 60 such that the base end is located adjacent to the top of the side wall of the tank 60. In some embodiments, the mechanical treatment subsystem may further include a skimmer device (not shown) at or just above the surface of the wastewater or effluent in the tank 60 that may travel generally parallel to the surface of the wastewater or effluent and remove materials from the surface thereof.

In the embodiment shown, tank 60 is also equipped with a sensor array 65 that may be used to measure (e.g., continuously monitor) one or more properties of the treated water. Sensor array 65 is also communicatively coupled to information handling system 30, and may send data regarding one or more properties of the treated wastewater or effluent in tank 60 to the information handling system 30, which may use that data to confirm the effectiveness of the chemical and mechanical treatments and/or store that data for use in selecting future treatments. In some embodiments if the data from sensor array 65 indicates that one or more properties of the treated water in tank 60 is above or below a predetermined level, information handling system 30 may he programmed to perform one or more actions in response to such data, including but not limited to changing one or more parameters of the chemical and/or mechanical treatments performed in system 10 and/or ceasing flow of wastewater or effluent through one or more components of the system 10.

Tank 60 may further include an outlet (not shown) through which water may be released after mechanical treatment. The treatment system 10 may further include a secondary treatment unit 70 such as a reverse osmosis treatment unit, electrocoagulation unit, or a specialized filter that may be used, for example, to remove salts or other species dissolved in the water. The treatment system 10 may further include another vessel or tank 80 coupled to the secondary treatment unit 70, among other reasons, for holding treated water for disposal, discharge, or further use. The system 10 also optionally may include one or more pumps or other devices (not shown) for moving treated water from the tank 60 into secondary treatment unit 70 and/or tank 80.

Figure 2:
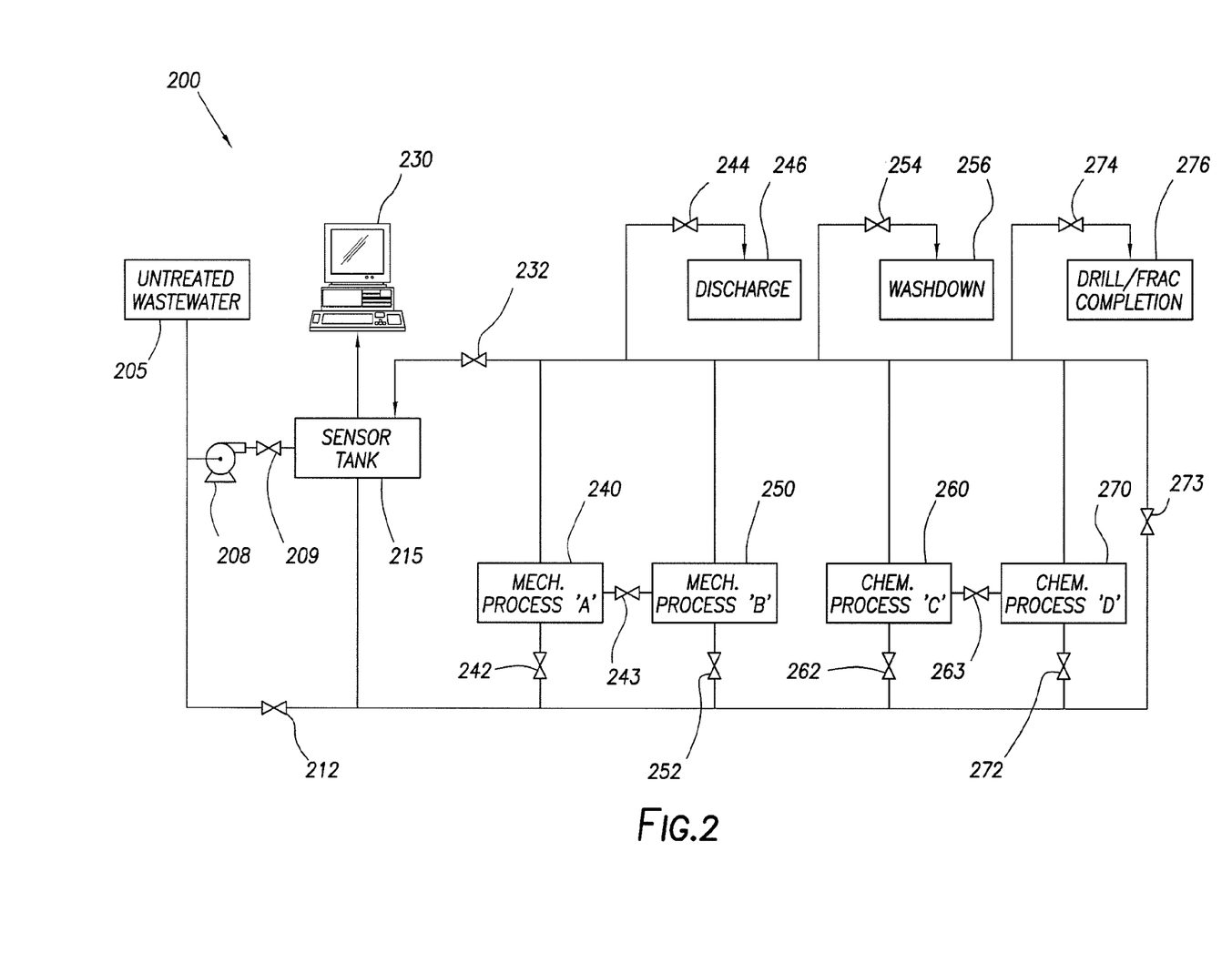
FIG. 2 is a diagram illustrating another treatment system according to certain embodiments of the present disclosure.

Another example of a treatment system according to certain aspects of the present disclosure is illustrated in FIG. 2. The treatment system 200 may be located at a well site, jobsite, offshore rig, ship, or any other location where wastewater or effluent carrying waste materials is treated. The components of the treatment system illustrated in FIG. 2, as well as any other components of that system, may be housed together in a single unit, or may be provided as one or more separate modules or tanks that may be connected and/or otherwise used together to perform different portions of the treatment process.

Referring now to FIG. 2, treatment system 200 includes a holding tank 205 in which untreated wastewater or effluent may be deposited. Tank 205 may be coupled to a sensor tank 215 into which untreated wastewater or effluent may be pumped from tank 205 using a pump 208. Valve 209 also may be disposed between the pump 208 and sensor tank 215 to regulate the flow of wastewater or effluent into the sensor tank 215. Sensor tank 215 is equipped with an array of sensors (not shown) for measuring one or more initial properties of the untreated wastewater or effluent. The system 200 further may include a sample treatment subsystem (not shown), which may be integrated with the sensor tank 215 or information handling system 230, in which one or more different types of treatments may be performed on a sample of the wastewater or effluent from the sensor tank 215 or holding tank 205 and the properties of the treated sample may be measured.

The sensor arrays in sensor tank 215 are communicatively coupled to an information handling system 230, which may be disposed at the same location as the rest of system 200 or may reside at a remote location. The information handling system 230 receives the data from the sensor arrays in the sensor tank 215 and uses that data to select one or more chemical treatments and one or more mechanical treatments (including parameters thereof) to neutralize and/or remove waste material from the untreated wastewater or effluent in holding tank 205. Once the appropriate treatments have been selected, the wastewater or effluent may be allowed to flow out of holding tank 205 by opening valve 212 downstream of the holding tank, thereby allowing the wastewater or effluent to bypass sensor tank 215 and flow into the remainder of the treatment system.

System 200 further includes two mechanical treatment subsystems 240 and 250 and two chemical treatment subsystems 260 and 270 into which wastewater or effluent may flow. As a person of skill in the art will recognize with the benefit of this disclosure, a system of the present disclosure may include any number of mechanical and/or chemical treatment subsystems, which may be arranged in series or in parallel. In the embodiment shown, the flow of wastewater or effluent into the mechanical and chemical treatment subsystems is controlled by a series of valves 242, 243, 252,

262, 263, 272, 273 and 274. These valves may be opened and closed, among other purposes, to select the mechanical and chemical treatment subsystems into which wastewater or effluent will flow and when the wastewater or effluent will flow into those subsystems. For example, if the information handling system 230 determines that the wastewater or effluent should be treated with a mechanical treatment "A" followed by a mechanical treatment "B", at least valves 242 and 243 will be opened to allow the wastewater or effluent to flow into mechanical treatment subsystem 240 first, and then into mechanical treatment subsystem 250. Valve 252 then may be opened when the mechanical treatments are complete. Similarly, if the information handling system 230 determines that the wastewater or effluent should be treated with a chemical treatment "C" followed by a chemical treatment "D", at least valves 262 and 263 will be opened to allow the wastewater or effluent to flow into chemical treatment subsystem 260 first, and then into chemical treatment subsystem 270. Valve 272 or valve 274 then may be opened when the mechanical treatments are complete. In other embodiments, one or more of valves 242, 243, 252, 262, 263, 272, 273, and 274 may be closed to allow the wastewater or effluent to bypass the corresponding mechanical or chemical treatment subsystem. In some embodiments, the information handling system also may be communicatively coupled to interfaces associated with one or more of valves 242, 243, 252, 262, 263, 272, 273, and 274 to control the flow of wastewater or effluent to the various treatment subsystems.

System 200 also further includes valves 244 and 254 which control the flow of waste materials such as solids, oils, emulsions, etc. out of the mechanical treatment subsystems 240 and 250. For example, valve 244 may control the flow of waste materials into a discharge tank 246 and valve 254 may control the flow of waste materials into a washdown tank 256. In some embodiments, interfaces associated with valve 244 and/or 254 also may be communicatively coupled to the information handling system 230 so that the information handling system 230 may control the operation of those valves.

Once the wastewater or effluent has been fully treated, valve 274 may be opened to allow treated water to flow into a tank or subsystem 276 in which treatment fluids used in one or more on-site operations, including but not limited to fracturing fluids, drilling fluids, completion fluids, etc., may be prepared using the treated water. In some embodiments, a portion of water treated in the mechanical and/or chemical treatment subsystems may be circulated back into the sensor tank 215, among other reasons, in order to monitor and/or confirm the properties of the treated water. This may be accomplished by opening at least valves 232 and 273 as water flows out of those subsystems.

Figure 3:
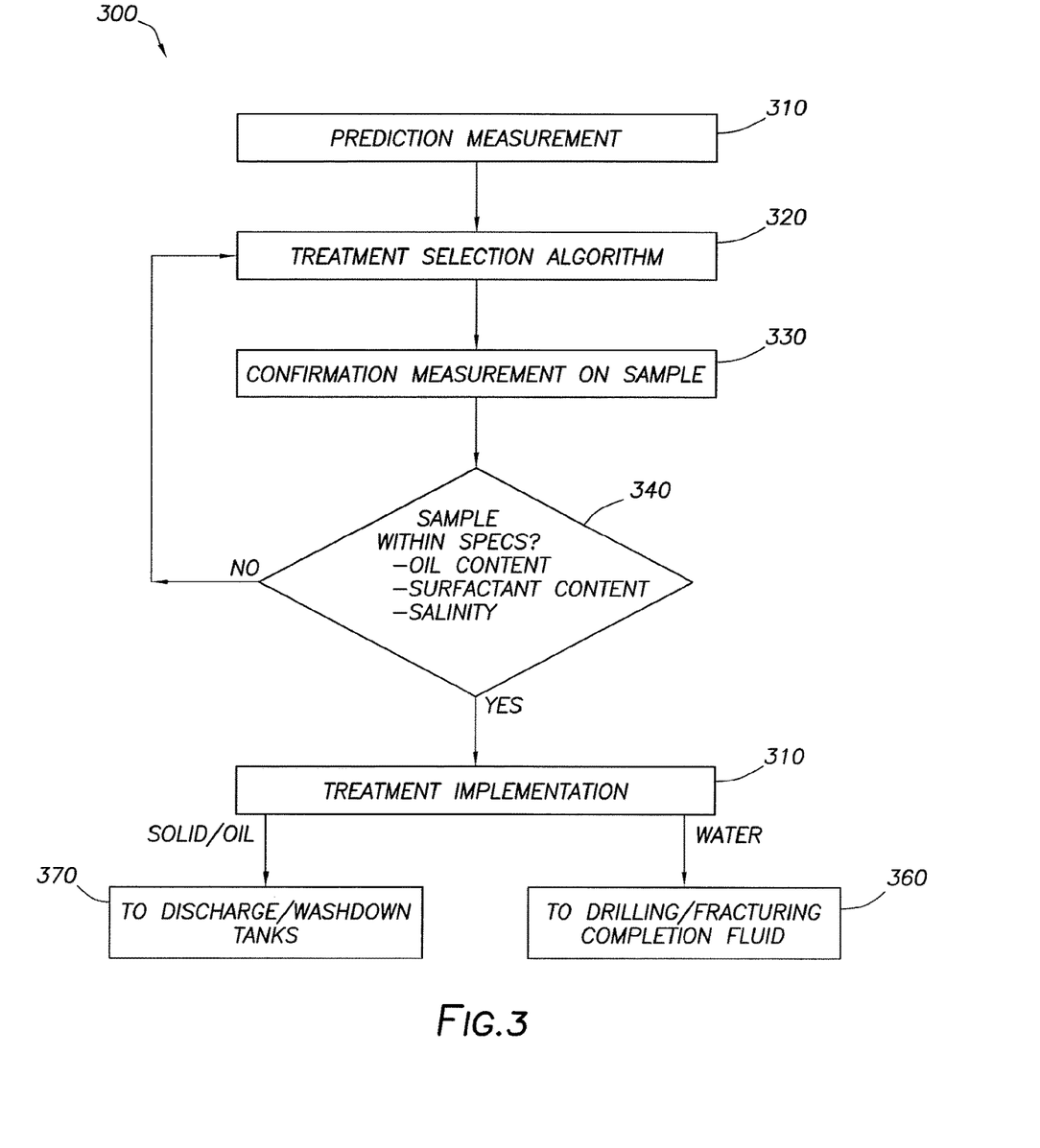
FIG. 3 is a flowchart illustrating a treatment process according to certain embodiments of the present disclosure.

An example of a process for performing treatments according to the present disclosure is depicted in the flowchart shown in FIG. 3. Referring now to FIG. 3, process 300 starts with step 310 wherein a first set of data regarding initial properties of untreated wastewater or effluent is obtained (e.g., using a sample measurement device or measurement from the bulk volume of untreated wastewater or effluent). Then, at step 320, one or more potential treatment plans to reduce the amount of waste material in the wastewater or effluent may be selected based on the first set of data, the potential treatment plans each including at least one chemical treatment and at least one mechanical treatment. The potential treatment plan(s) may be applied to sample(s) of the untreated wastewater or effluent at step 330, and a second set of data regarding the properties of each of the treated samples may be obtained. At step 340, the set of data regarding the treated samples may be used to determine whether one or more of the potential treatment plans was effective in sufficiently reducing the amount of waste material in the wastewater or effluent. For example, the data regarding properties of the different treated samples may be compared to specifications (e.g., regulations or other requirements) for the treated wastewater or effluent that involve maximum threshold values for one or more properties, including but not limited to oil content, surfactant content, and/or salinity.

If a potential treatment plan(s) corresponding to one or more treated water samples meet those specifications, one of those effective potential treatment plans may be implemented at step 350 in treating larger amounts of untreated wastewater or effluent. Following that treatment, at step 360, the treated water may be transferred (e.g., pumped) to one or more tanks or other equipment for use in various treatment fluids used at the well site or job site, including but not limited to drilling fluids, fracturing fluids, completions fluids (e.g., completions brines), and the like. In some embodiments, the treated water may be mixed with one or more additional components (not shown) prior to use in those treatments. Also following the treatment at step 350, waste materials such as solids, oils, emulsions, etc. may be discharged at step 370 to one or more discharge and/or washdown tanks for disposal.

Referring back to step 340, if more than one potential treatment plan was deemed to be effective at this step, one of those treatment plans may be selected based on any number of different criteria, including but not limited to cost of treatment, time needed for treatment, and/or the quantitative amount or percentage by which the treatment plan reduced the amount of various waste materials in the wastewater or effluent. If none of the potential treatment plans is deemed sufficiently effective at step 340, process 300 may return to step 320 where additional potential treatment plans may be selected for evaluation.

Figure 4:
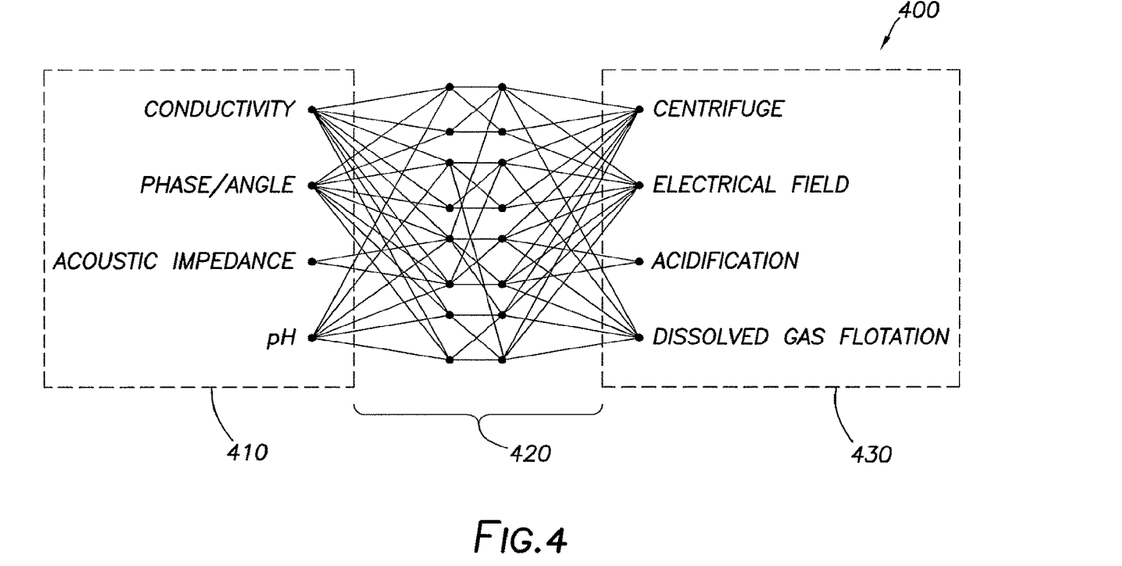
FIGS. 4 and 5 are diagrams illustrating neural networks for selecting treatments in certain embodiments of the present disclosure.
Figure 5:
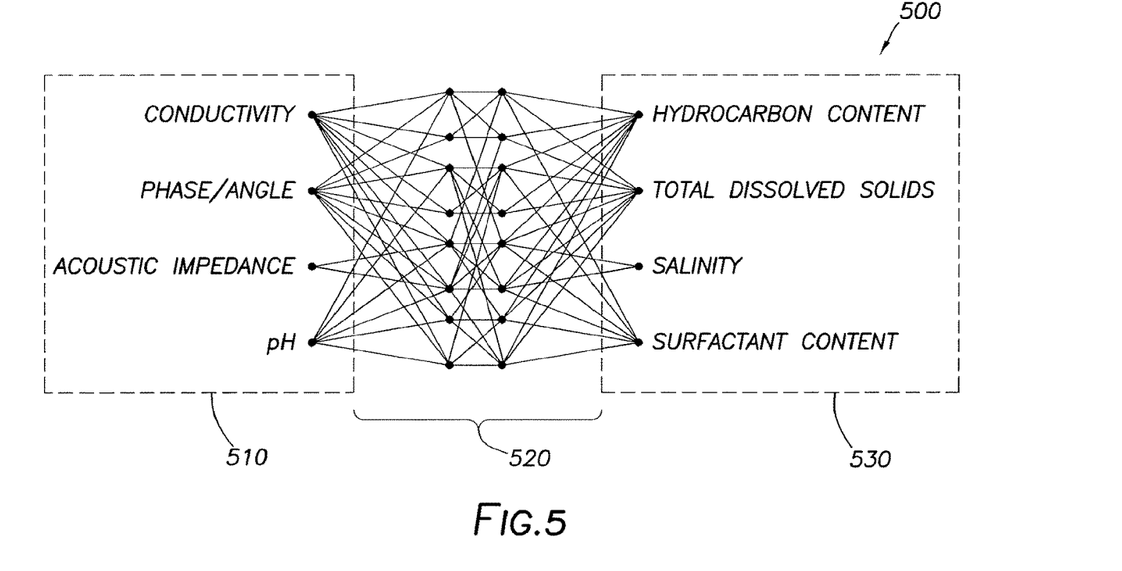

Examples of neural networks that may be used to select chemical and mechanical treatments are illustrated in FIGS. 4 and 5. The neural networks illustrated in FIGS. 4 and 5 may be housed, for example, on an information handling system that is used to select chemical and/or mechanical treatments for wastewater or effluent as described above. Referring now to FIG. 4, the neural network 400 includes a set of input data 410 that includes various measurable or observable initial properties of the untreated wastewater or effluent (e.g., electrical conductivity, phase angle, acoustic impedance, pH). The network 400 may apply a series of logic layers or functions 420 to the input data 410, which may use algorithms or predictive rules (e.g., from literature, historical testing data, etc.) to select chemical and/or mechanical treatments (e.g., centrifuge, electrical field, acidification, dissolved air flotation) that are expected to reduce the amount of waste material in wastewater or effluent having the properties indicated in the input data 410. Those chemical and/or mechanical treatments are provided as outputs 430 of the neural network 400.

Referring now to FIG. 5, an example of a neural network that may be used to select treatments that minimize levels of certain properties of the treated wastewater or effluent is illustrated in FIG. 5. The neural network 500 includes a set of input data 510 that is similar to the input data of the network 400 in FIG. 4, including various measurable or observable initial properties of the untreated wastewater or effluent. The network 500 may apply a series of logic layers or functions 520 to the input data 510, which may use algorithms or predictive rules (e.g., from literature, historical testing data, etc.) to determine the lowest levels of various output properties 530 (e.g., hydrocarbon content, total dissolved solids, salinity, surfactant content) that may be achieved by treating that wastewater or effluent. The combination of chemical and/or mechanical treatments that produced this set of properties in the neural network 500 then may be applied to the wastewater or effluent in a particular application of the present disclosure.

An embodiment of the present disclosure is a system including: a test treatment subsystem including one or more sensors, the test treatment subsystem configured to obtain a first set of data regarding one or more initial properties of untreated wastewater or effluent using the sensors, perform one or more potential chemical treatments and one or more potential mechanical treatments on a sample of the untreated wastewater or effluent, and obtain a second set of data regarding one or more properties of the treated sample using the sensors; one or more chemical treatment subsystems in which one or more chemical additives react with one or more waste materials in the untreated wastewater or effluent; one or more mechanical treatment subsystems in which the waste materials in the wastewater or effluent is physically separated from water; at least one information handling subsystem communicatively coupled to the test treatment subsystem, the chemical treatment subsystems, and the mechanical treatment subsystems, the information handling subsystem being configured to: receive the first and second sets of data from the sensors, use the first and second sets of data to select at least one chemical treatment and at least one mechanical treatment to reduce the amount of one or more waste materials in the untreated wastewater or effluent, control one or more components of at least one chemical treatment subsystem to perform the selected chemical treatment on the untreated wastewater or effluent, and control one or more components of at least one mechanical treatment subsystem to perform the selected mechanical treatment on the wastewater or effluent.

In one or more embodiments described in the preceding paragraph, the system is located on an offshore rig or ship. In one or more embodiments described above, the one or more initial properties of untreated wastewater or effluent include at least one property selected from the group consisting of: pH, turbidity, emulsion strength, capacitance, dielectric constant, impedance, loss tangent, reactance phase angle, acoustic attenuation, acoustic relaxation, thermal conductivity, electrical conductivity, salinity, oil content, solids content, water content, and any combination thereof. In one or more embodiments described above, the chemical treatment subsystem includes a tank, a hopper for dispensing chemical additives into the tank, and an agitation device disposed in the tank. In one or more embodiments described above, the mechanical treatment subsystem includes a dissolved air flotation unit. In one or more embodiments described above, the mechanical treatment subsystem includes a skimmer device. In one or more embodiments described above, the mechanical treatment subsystem includes a centrifuge. In one or more embodiments described above, the information handling system includes a neural network that includes a set of input data that includes the one or more properties of the untreated wastewater or effluent. In one or more embodiments described above, the input data includes data regarding at least one property selected from the group consisting of: pH, turbidity, emulsion strength, capacitance, dielectric constant, impedance, loss tangent, reactance phase angle, acoustic attenuation, acoustic relaxation, thermal conductivity, electrical conductivity, salinity, oil content, solids content, water content, and any combination thereof.

Another embodiment of the present disclosure is a method including: providing untreated wastewater or effluent including water and at least one waste material; using a set of sensors to measure one or more properties of the untreated wastewater or effluent; performing at least one potential chemical treatment and at least one potential mechanical treatment on at least one sample of the untreated wastewater or effluent, wherein the at least one potential chemical treatment and at least one potential mechanical treatment are selected based on the one or more properties of the untreated wastewater or effluent; using a set of sensors to measure one or more properties of the treated sample; based at least in part on the data regarding the properties of the treated sample, using an information handling system to select at least one chemical treatment and at least one mechanical treatment; and using the information handling system to control one or more components of at least one chemical treatment subsystem and at least one mechanical treatment subsystem to perform the selected chemical treatment and the selected mechanical treatment on the untreated wastewater or effluent to produce treated water.

In one or more embodiments described in the preceding paragraph, the chemical treatment subsystem and the mechanical treatment subsystem are located on an offshore rig or ship. In one or more embodiments described above, the step of using an information handling system to select at least one chemical treatment and at least one mechanical treatment includes using a neural network that includes a set of input data that includes the one or more properties of the untreated wastewater or effluent. In one or more embodiments described above, the input data includes data regarding at least one property selected from the group consisting of: pH, turbidity, emulsion strength, capacitance, dielectric constant, impedance, loss tangent, reactance phase angle, acoustic attenuation, acoustic relaxation, thermal conductivity, electrical conductivity, salinity, oil content, solids content, water content, and any combination thereof. In one or more embodiments described above, the at least one chemical treatment subsystem and at least one mechanical treatment subsystem are located at a well site including a well bore that penetrates at least a portion of a subterranean formation; and the method further includes using at least a portion of the treated water to perform a subterranean treatment operation in the well bore. In one or more embodiments described above, the untreated wastewater or effluent was recovered from the well bore.

Another embodiment of the present disclosure is a method including: providing untreated wastewater or effluent including water and at least one waste material; using a set of sensors to measure one or more properties of the untreated wastewater or effluent; transmitting a first set of data regarding the one or more properties of the untreated wastewater or effluent to an information handling system; based at least in part on the first set of data, using the information handling system to select at least one potential chemical treatment and at least one potential mechanical treatment; performing the potential chemical treatment and the potential mechanical treatment on at least one sample of the untreated wastewater or effluent, wherein the at least one potential chemical treatment and at least one potential mechanical treatment are selected based on the one or more properties of the untreated wastewater or effluent; using a set of sensors to measure one or more properties of the treated sample; transmitting a second set of data regarding the one or more properties of the treated sample to the information handling system; based at least in part on the second set of data, using the information handling system to select at least one chemical treatment and at least one mechanical treatment; using the information handling system to control one or more components of at least one chemical treatment subsystem and at least one mechanical treatment subsystem to perform the selected chemical treatment and the selected mechanical treatment on the untreated wastewater or effluent to produce treated water, wherein the at least one chemical treatment subsystem and at least one mechanical treatment subsystem are located at a well site including a well bore that penetrates at least a portion of a subterranean formation; and using at least a portion of the treated water to perform a subterranean treatment operation in the well bore.

In one or more embodiments described in the preceding paragraph, the chemical treatment subsystem and the mechanical treatment subsystem are located on an offshore rig or ship. In one or more embodiments described above, at least a portion of the untreated wastewater or effluent was recovered from the well bore. In one or more embodiments described above, the step of using the information handling system to select at least one potential chemical treatment and at least one potential mechanical treatment includes using a neural network that includes a set of input data that includes the one or more properties of the untreated wastewater or effluent. In one or more embodiments described above, the input data includes data regarding at least one property selected from the group consisting of: pH, turbidity, emulsion strength, capacitance, dielectric constant, impedance, loss tangent, reactance phase angle, acoustic attenuation, acoustic relaxation, thermal conductivity, electrical conductivity, salinity, oil content, solids content, water content, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A system comprising:
   a test treatment subsystem comprising at least one sample treatment vessel and one or more sensors, the test treatment subsystem configured to:
      obtain a first set of data regarding one or more initial properties of untreated wastewater or effluent using the one or more sensors,
      perform one or more potential chemical treatments and one or more potential mechanical treatments on a sample of the untreated wastewater or effluent, and
      obtain a second set of data regarding one or more properties of the treated sample using the one or more sensors;
   one or more chemical treatment subsystems in which one or more chemical additives react with one or more waste materials in the untreated wastewater or effluent, wherein the one or more chemical treatment subsystems are separate from the test treatment subsystem;
   one or more mechanical treatment subsystems in which the one or more waste materials in the untreated wastewater or effluent is physically separated from water, wherein the one or more mechanical treatment subsystems are separate from the test treatment subsystem; and
   at least one information handling subsystem communicatively coupled to the test treatment subsystem, the one or more chemical treatment subsystems, and the one or more mechanical treatment subsystems, the at least one information handling subsystem being configured to:
      receive the first and second sets of data from the one or more sensors,
      use the first and second sets of data to select at least one chemical treatment of the one or more potential chemical treatments and at least one mechanical treatment of the one or more potential mechanical treatments to reduce an amount of the one or more waste materials in the untreated wastewater or effluent,
      control one or more components of at least one of the one or more chemical treatment subsystems to perform the at least one selected chemical treatment of the one or more potential chemical treatments on the untreated wastewater or effluent, and
      control one or more components of at least one of the one or more mechanical treatment subsystems to perform the at least one selected mechanical treatment of the one or more potential mechanical treatments on the untreated wastewater or effluent.

2. The system of claim 1 wherein the system is located on an offshore rig or ship.

3. The system of claim 1 wherein the one or more initial properties of the untreated wastewater or effluent comprise at least one property selected from the group consisting of: pH, turbidity, emulsion strength, capacitance, dielectric constant, impedance, loss tangent, reactance phase angle, acoustic attenuation, acoustic relaxation, thermal conductivity, electrical conductivity, salinity, oil content, solids content, water content, and any combination thereof.

4. The system of claim 1 wherein the at least one of the one or more chemical treatment subsystems comprises a tank, a hopper for dispensing the one or more chemical additives into the tank, and an agitation device disposed in the tank.

5. The system of claim 1 wherein the at least one of the one or more mechanical treatment subsystems comprises a dissolved air flotation unit.

6. The system of claim 1 wherein the at least one of the one or more mechanical treatment subsystems comprises a skimmer device.

7. The system of claim 1 wherein the at least one of the one or more mechanical treatment subsystems comprises a centrifuge.

8. The system of claim 1 wherein the at least one information handling subsystem comprises a neural network that comprises a set of input data that includes the one or more initial properties of the untreated wastewater or effluent.

9. The system of claim 8 wherein the set of input data comprises data regarding at least one property selected from the group consisting of: pH, turbidity, emulsion strength, capacitance, dielectric constant, impedance, loss tangent, reactance phase angle, acoustic attenuation, acoustic relaxation, thermal conductivity, electrical conductivity, salinity, oil content, solids content, water content, and any combination thereof.

10. The system of claim 1 wherein the system is located at a well site comprising a well bore that penetrates at least a portion of a subterranean formation.

11. The system of claim 10 wherein the untreated wastewater or effluent was recovered from the well bore.

12. The system of claim 9 wherein the system is located on an offshore rig or ship.

13. The system of claim 9 wherein the at least one of the one or more chemical treatment subsystems comprises a tank, a hopper for dispensing the one or more chemical additives into the tank, and an agitation device disposed in the tank.

14. The system of claim 9 wherein the at least one of the one or more mechanical treatment subsystems comprises a dissolved air flotation unit.

15. The system of claim 9 wherein the at least one of the one or more mechanical treatment subsystems comprises a skimmer device.

16. The system of claim 9 wherein the at least one of the one or more mechanical treatment subsystems comprises a centrifuge.

17. The system of claim 9 wherein the system is located at a well site comprising a well bore that penetrates at least a portion of a subterranean formation.

18. The system of claim 17 wherein the untreated wastewater or effluent was recovered from the well bore.

19. The system of claim 1 wherein the at least one of the one or more mechanical treatment subsystems comprises a dissolved air flotation unit, and wherein the at least one of the one or more chemical treatment subsystems comprises a tank, a hopper for dispensing the one or more chemical additives into the tank, and an agitation device disposed in the tank.

20. The system of claim 1 wherein the at least one of the one or more mechanical treatment subsystems comprises a skimmer device, and wherein the at least one of the one or more chemical treatment subsystems comprises a tank, a hopper for dispensing the one or more chemical additives into the tank, and an agitation device disposed in the tank.

\* \* \* \* \*